METHOD OF ASSEMBLING ELECTRONIC COMPONENTS
Filed April 15, 1955 2 Sheets-Sheet 1
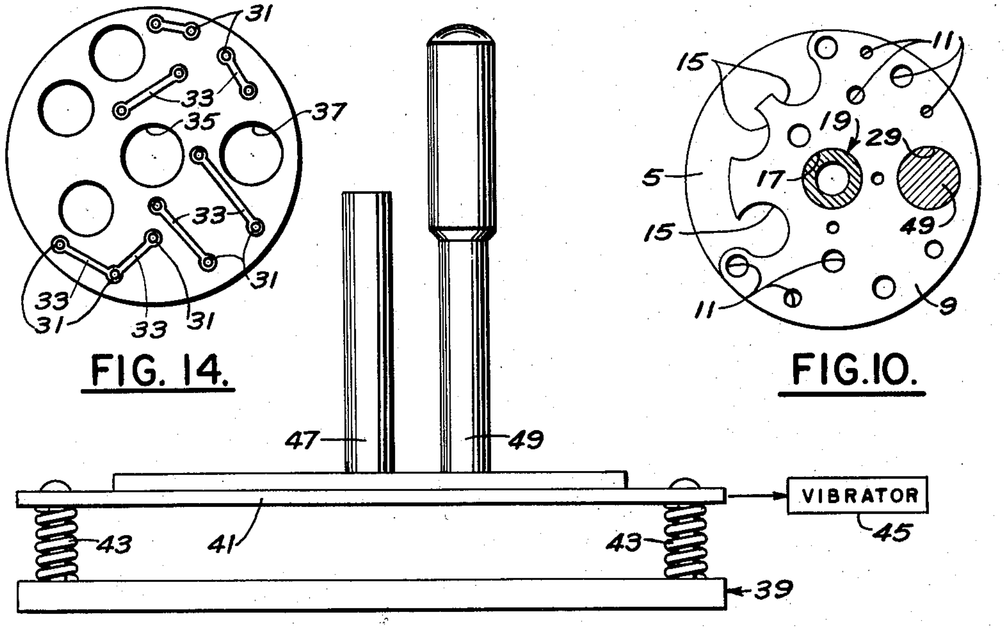
FIG. 14. FIG. 10.
FIG. 1.
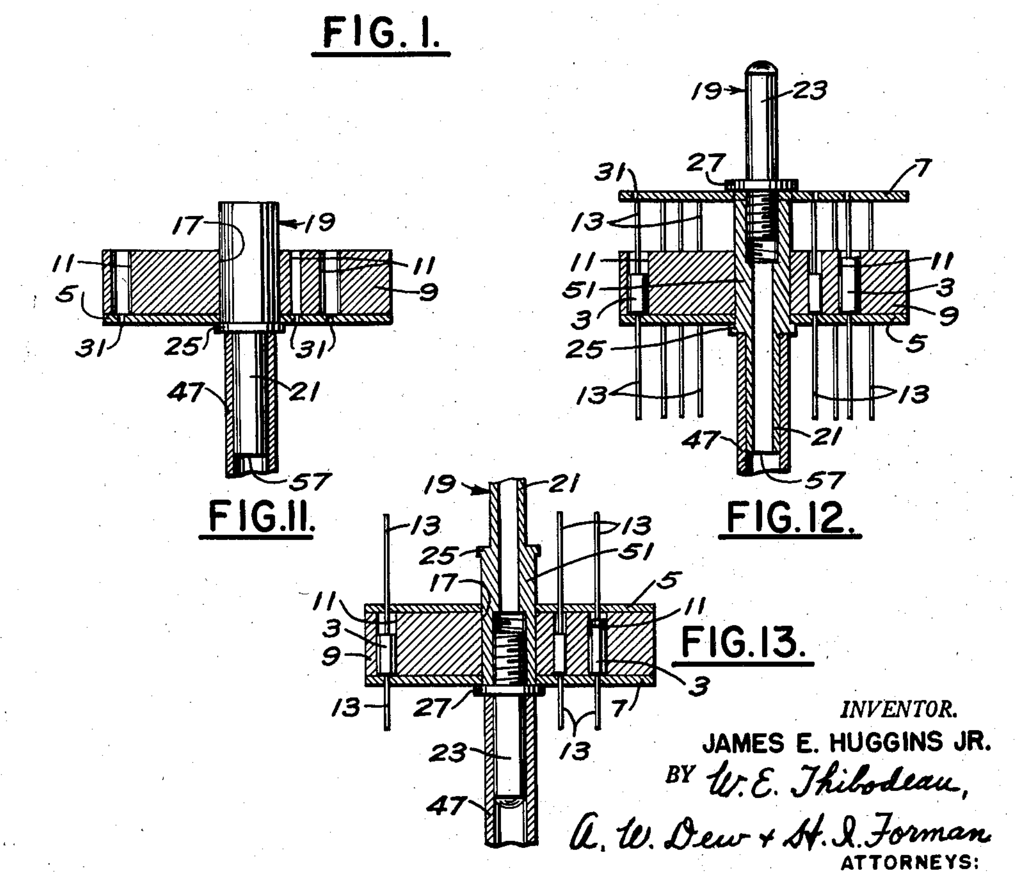
FIG. 11. FIG. 12. FIG. 13.
INVENTOR.
JAMES E. HUGGINS JR.
BY W. E. Thibodeau,
A. W. Dew + H. I. Forman
ATTORNEYS:

METHOD OF ASSEMBLING ELECTRONIC COMPONENTS

Filed April 15, 1955 2 Sheets-Sheet 2

INVENTOR.
JAMES E. HUGGINS JR.
BY W. E. Thibodeau,
A. W. Dew + H. J. Forman
ATTORNEYS:

2,871,547

METHOD OF ASSEMBLING ELECTRONIC COMPONENTS

James E. Huggins, Jr., Fayetteville, N. Y.

Application April 15, 1955, Serial No. 501,754

16 Claims. (Cl. 29—155.5)

Figure 2:
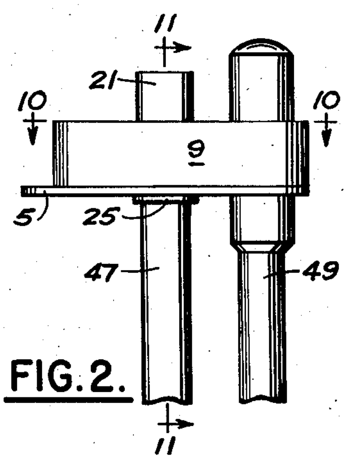

(Granted under Title 35, U. S. Code (1952), sec. 266)

The invention described herein may be manufactured and used by or for the Government for governmental purposes without the payment of any royalty thereon.

The present invention relates to the manufacture of electronic equipment and more particularly to a method of assembling electrical components into a composite unit.

In the evolution of production techniques of manufacture for electronic equipment, progress has been greatly facilitated by two lines of approach, namely, the use of standard components and printed circuits. These lines have contributed much toward space saving by way of miniaturization and automatic, mechanical assembly. For example, a generally accepted method heretofore successfully employed is the use of a plate wherein the components lie parallel to and against one side thereof with their leads bent at right angles and extending through the plate for connection with the printed wiring or circuit disposed on the opposite side of the plate.

Although arrangements of this kind possess considerable merit, practice has shown that they are not without disadvantage. Component leads require the added operation of bending thereby increasing the probability of damage and complicating methods involved in mechanical assembly. In some cases, this arrangement restricts the complexity of the circuit because of the limitations on available surface area for wiring and placement of components. In an effort to overcome such disadvantages, it has been proposed to assemble the components in parallel fashion between two plates with the leads thereof extending through openings in the plates for connection circuitwise.

Although this design offers many advantages, techniques of assembly for this so-called "sandwich" type of design have proven rather difficult. Component leads can be inserted easily into the openings of one plate, but it is extremely difficult to get the component leads through the openings in the other plate.

A primary object of the present invention is to provide a method of assembly for electrical components which will overcome the above as well as other disadvantages of prior art methods.

It is also an object of the present invention to provide a relatively simple and easy method of assembling electrical components utilizing the so-called "sandwich" type of design.

Another object of the present invention is to provide a method of assembly for electrical components which is particularly adaptable to and conducive with the use of printed circuit techniques.

A further object of the present invention is to provide a method of assembling electrical components which is easily applicable to automatic assembly methods.

Still further it is an object of the present invention to provide a method of assembling electrical components which can be quickly and easily accomplished and with a minimum of apparatus.

In the attainment of the foregoing objects, the method proposed by the present invention comprises the following steps in the manufacture of a unit embodying a plurality of electrical components which have leads extending from at least one end thereof; providing a catacomb having a plurality of openings disposed parallel to each other and extending therethrough; providing first and second end plates for the catacomb having openings therethrough which are correspondingly located with respect to the catacomb openings; supporting the catacomb substantially in contact with and above the first end plate; inserting the electrical components into the catacomb openings with the leads of those components to be associated with the first end plate extending through the openings in that plate; supporting the second end plate with the openings thereof in a position to receive the leads of the components to be associated therewith; moving the catacomb away from the first end plate substantially into contact with the second end plate; inverting the assembly of the end plates, the catacomb and the components; influencing the component leads associated with the second end plate through the openings in that plate; and moving the first end plate substantially into contact with the catacomb. Employing this method results in a unit wherein the components are disposed within the confines of the catacomb and "sandwiched" between the end plates with their leads extending through the end plates. The invention contemplates that the end plates will be provided with printed circuit connections extending between selected openings on the faces thereof disposed outwardly of the unit. The component leads are then connected to the printed circuit connections by suitable means, such as dip soldering, and the excess lead lengths are clipped off thereby providing a printed circuit unit. In addition, the invention provides for the use of a pilot catacomb to facilitate inserting the components into the catacomb, the use of a jig or work holder to facilitate assembly operations, and employing a vibrator to agitate the jig and the members supported thereon to facilitate threading the component leads through the openings in the end plates.

Figure 3:
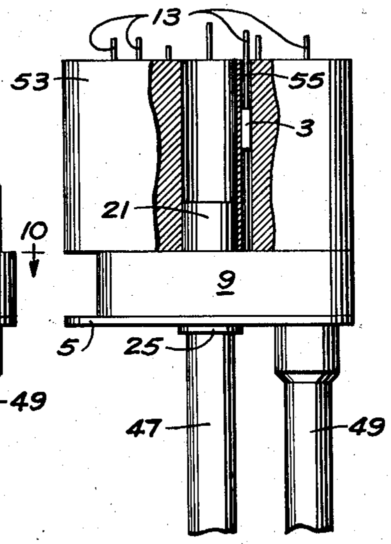
Figure 4:
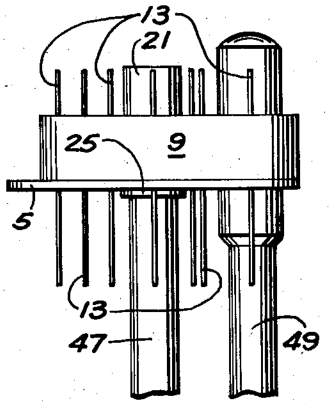
Figure 5:
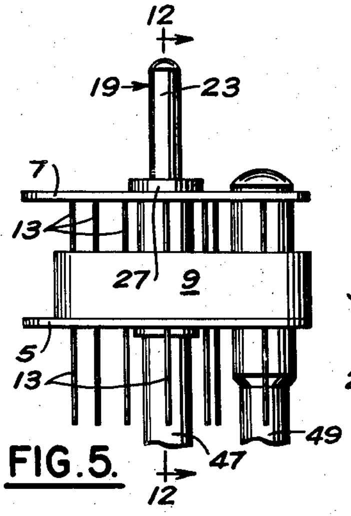

The novel features characteristic of the present invention, as well as additional objects and advantages thereof, will be understood better from the following detailed description when read in connection with the accompanying drawings in which, Figure 1 is a side view of one embodiment of apparatus employed in practicing the method of the present invention, Figure 2 is a side view of a portion of the apparatus shown in Figure 1 together with the first end plate and the catacomb of the finished unit supported thereon, Figure 3 is a side view of the members shown in Figure 2 together with the pilot catacomb employed in a subsequent assembly step to insert the electrical components into the unit, Figure 4 is a side view of the members shown in Figure 3 and illustrating the assembly subsequent to removal of the pilot catacomb, Figure 5 is a side view of the members shown in Figure 4 illustrating an assembly step subsequent thereto and showing the second end plate supported in position to receive the component leads to be associated therewith.

Figure 6:
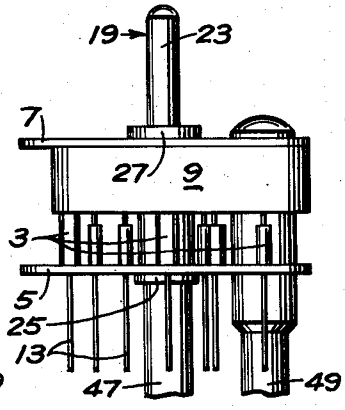
Figure 7:
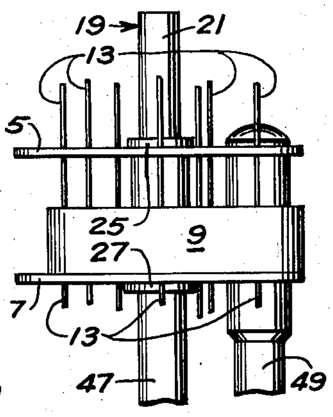
Figure 8:
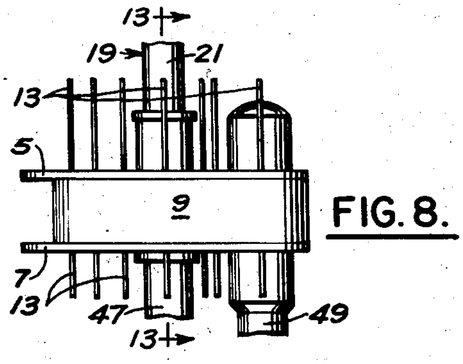
Figure 9:
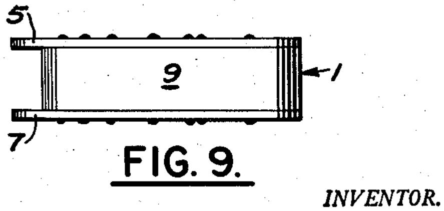

Figure 6 is a side view of the apparatus shown in Figure 5 to illustrate the relationship of parts after the catacomb has been moved upwardly away from the first end plate substantially into abutment with the second end plate, Figure 7 is a side view, similar to Figure 6, but showing the relationship of parts after the subsequent method step of inverting the assembly, Figure 8 is a side view of the apparatus shown in Figure 7 after the first end plate has been moved into position substantially into abutment with the catacomb, Figure 9 is a side view of the completed assembly, Figure 10 is a plan view, in section, taken along the line 10—10 of Figure 2, showing the openings in the catacomb for receiving the electrical components, Figure 11 is a side view, in section, of the apparatus shown in Figure 2, taken along the line 11—11 of Figure 2, Figure 12 is a side view, in section, of the apparatus shown in Figure 5, taken along the line 12—12 in Figure 5, Figure 13 is a side view, in section, of the members shown in Figure 8, taken along the line 13—13 in Figure 8, and Figure 14 is a plan view of an end plate showing the printed circuit connections disposed on one face thereof.

Referring more particularly to the drawings, wherein similar reference numerals have been used to designate corresponding parts throughout, the method steps employed in practicing the present invention are illustrated using apparatus of preferred form to assist in assembling the finished product.

The finished product to which the present invention is particularly directed comprises a printed circuit assembly 1 useful as a composite unit in electronic apparatus. The particular design of the assembly or unit 1 is commonly referred to as a "sandwich" type wherein the electrical components 3 are disposed between a pair of end plates 5, 7.

In order to maintain the components 3 disposed in parallel relation with each other, as well as to keep them separate, a catacomb 9 is provided. The catacomb may be made from any suitable material but where electrical components are concerned it is preferable to employ an insulating type of material. A plurality of apertures or openings 11 are provided in the catacomb of a size sufficient to receive the respective components with adequate clearance to an extent conducive to vibrate the components within the apertures. The openings extend through the catacomb so that the components may be disposed therewithin with their respective leads 13 extending outwardly beyond the limits of the catacomb. One or more other openings or "cut-out" portions 15 may be provided to accommodate vacuum tubes (not shown) or other larger components. A central aperture 17 is disposed in the catacomb through which a jig, shaft, or assembling pin 19 may be inserted to facilitate assembly. The catacomb 9 may also be provided with another aperture 29 offset from the central aperture 17 which is useful in orienting the assembly.

The jig, shaft, or assembling pin 19 is made in two parts or sections 21, 23 which are threadedly engageable with one another and in axial alignment. For reference purposes, each of these sections are hereinafter referred to as the first or lower section 21 of the jig and the second or upper section 23 of the jig. Each section of the jig is provided with an annular shoulder 25, 27 the purpose of which will become apparent from the description hereinafter.

The end plates 5, 7 comprise discs made from a suitable insulating material. The plates are relatively thin as compared to the catacomb and need only be thick enough to receive the leads of the components for interconnection on the face thereof to be disposed outwardly of the unit. For purposes of description, the end plates are referred to hereinafter as the first end plate 5 and the second end plate 7. Figure 14 is a plan view of the second end plate 7 and is representative of the structure of both end plates. Each of the plates is provided with apertures 31 through which the component leads 13 are to be inserted. The diameters of these apertures should be somewhat larger than those of the component leads thereby to facilitate threading of the leads through the apertures. Orientation of the apertures should be harmonious with an arrangement which is compatible with the circuit the unit is designed for and the locations of the apertures in the catacomb should be coordinated with those in the end plates. Although it is not essential, the end plates may be provided, on at least one side thereof, with printed circuit connections 33 between selected ones of the openings corresponding to connections between components as shown in a particular electrical circuit for which the unit is designed. In addition, each of the end plates is provided with a central aperture 35 for receiving the jig 19 and on orienting aperture 37 similar to related apertures provided in the catacomb.

For convenience and to facilitate assembly operations, it is found preferable to provide vibrating apparatus 39 useful in inserting the components with their leads into the catacomb and end plates. As shown in Figure 1, one embodiment of apparatus comprises a flexible type of support, in this case, a platform 41 supported by coil springs 43 in such manner as to be capable of being vibrated. The platform 41 is appropriately connected or attached to any suitable type of mechanical vibrating apparatus herein illustrated only in block diagram form 45. Mounted on top of the support and extending in a vertical direction upwardly is a tube 47 and adjacent thereto a spindle 49. The tube is open at the upper end thereof and is of a size to receive freely either end of the jig 19. The spindle 49 is so located and is of a size to fit within the orienting openings 29, 37 provided in the catacomb and end plates.

Assembly of the unit 1 is then accomplished in the following manner: The first end plate 5 is supported substantially in contact with the catacomb 9 with the respective openings thereof in alignment. To facilitate this operation, the first section 21 of the jig is disposed with its threaded end 51 extending through the central openings 17, 35 in the catacomb and the first end plate and with the first end plate supported by shoulder 25 of the jig first section (see Figure 2). The assembly thus far is arranged with the catacomb disposed above and substantially in abutment with the first end plate and with their respective openings in alignment. If the first end plate is provided with printed circuit connections on at least one side thereof, this side should be placed facing downwardly.

The next step is to place the components into their respective openings in the catacomb with the leads of those components to be associated with the first end plate extending through the openings therein. This may be accomplished either manually or mechanically. In order to facilitate loading of the components, a pilot catacomb 53 may be provided which has openings 55 therethrough correspondingly located with respect to the openings in the permanent catacomb 9. If this pilot catacomb is employed, it is supported above and oriented with the permanent catacomb on the jig first section 21 (see Figure 3). The components are then influenced into position within the permanent catacomb 9 with the leads thereof extending downwardly through the first end plate opening 31. Influencing the components into position may be accomplished with the assistance of vibrating apparatus shown in Figure 1. This is done by placing the end 57 of the jig first section 21 sufficiently into the open end of the tube 47 to support the assembly by the shoulder 25 of the first section and at the same time disposing the spindle 49 through the orienting openings 29, 37 in the catacomb and end plates. The vibrating machine 45 is then operated to vibrate the entire assembly with the result that the components are moved or vibrated sufficiently relative to the catacomb and the end plate to permit the component leads to be influenced by the force of gravity through the openings in the end plate and to dispose the components themselves within the confines of the catacomb. Placement of the components in this position having been accomplished, the vibrator is turned off and the pilot catacomb 53 is removed.

The assembly of parts thus far will then be as shown in Figure 4. It should be noted, however, that where the bodies of the components are of substantially equal lengths, assuming their leads also to be equal in length, that no problem exists when the assembly is inverted for threading the leads through the second end plate 7. Where the bodies of the components are of different lengths, as shown in Figures 6, 12 and 13, assuming their leads to be of substantially equal lengths, the leads of the shorter component bodies are apt to drop out of the apertures in the first end plate when the assembly is inverted. In order to obviate this condition, and retain the leads within the openings in the first end plate, it is recommended that, in the case of those components having leads extending from opposite ends thereof, that the leads to be associated with the second end plate be fore-shortened. The lengths of the shortened leads should be such that after the components are disposed with their longer leads extending through the first end plate openings, their upwardly extending shorter leads should terminate at substantially the same distance from the first end plate once the component bodies are disposed resting upon the first end plate, as particularly shown in Figure 12 of the drawings. It may also be found preferable to shorten the leads associated with the second end plate as much as possible thereby to reduce any error in misalignment of the leads with the apertures in the second end plate which otherwise would be accentuated by a relatively long lead.

The next step is to place the second end plate 7 on the jig 19 above the upwardly extending component leads and oriented in a position to receive those leads in that end plate's openings. The second section 23 of the jig is then threadedly engaged with the first section 21 and the assembly will assume the position of parts as shown in Figure 5 of the drawings. Subsequent thereto, the catacomb 9 is moved upwardly away from the first end plate 5 substantially into contact with the second end plate 7, the position shown in Figure 6 of the drawings. In this position, the permanent catacomb will serve as a guide in directing the upwardly extending leads through the second end plate openings. The assembly is then inverted so that the members will assume the positions shown in Figure 7, that is, the catacomb 9 will be supported above the second end plate 7 and the first end plate 5 will be supported above and spaced from the catacomb but with the component leads still disposed within the openings thereof.

The component leads to be associated with the second end plate 7 are then influenced through the openings in that end plate. Again this may be accomplished with the aid of the vibrator apparatus by placing the second section 23 of the jig 19 within the open end of the tube 47 in the same manner as heretofore described. Vibrating the assembly will influence the component leads through the openings in the second end plate 7 such that the first end plate 5 can then be brought downwardly substantially into contact with the catacomb. If the leads associated with the second end plate have been fore-shortened, as mentioned above, the leads will readily thread themselves through the second end plate openings without any of the leads becoming removed from the openings in the first end plate. Thus, the parts will be made to assume the positions shown in Figure 8 of the drawings.

The "sandwich" assembly of the catacomb, with the components disposed within the confines thereof and with the end plates disposed substantially in contact with the catacomb and with the component leads extending outwardly of the unit through the openings in the end plates, is then separated from the jig 19 and any other apparatus. It is then ready for subsequent assembly operations to connect the components in accordance with the circuit of which they are to form a part.

Once the assembly jig is removed, the assembly may then be held intact by substituting another type of clamp for the original jig which will be more suitable to dip soldering techniques. The assembly is then subjected to dip soldering or other suitable techniques which will permanently attach the component leads to the printed circuit connections or in a way suitable to connect them electronically in circuit. The excess portions of the leads are then cut off or removed and the assembly assumes a finished unit of the type more particularly shown in Figure 9 of the drawings. If vacuum tubes are to be included in the unit, these may be inserted in position at any convenient time during the dip soldering operation or even subsequent thereto.

From the foregoing description, it will become apparent that the assembly methods will lend themselves readily, simply and economically to full automatic production. Hopper feeding of components from bulk will prove easy as the component leads are left straight and do not require pre-forming. Although the techniques involved are readily applicable to automatic production, they are adaptable also to pilot-line or small quantity production where assembly customarily is manually performed.

In its simplest form, it will be recognized that assembly can be performed simply and easily by employing only the following major steps: a printed circuit end plate and catacomb are supported together with their openings in alignment; the components are inserted into the openings in the catacomb with leads thereof being influenced through the end plate openings; a second end plate is disposed adjacent to the leads extending oppositely with respect to the first mentioned leads and with the openings oriented to receive the leads; the catacomb is moved away from the first mentioned end plate into substantial abutment with the second mentioned end plate; the assembly is inverted to permit influencing, as by shaking or vibrating, the leads through the openings in the second mentioned end plate while maintaining the leads within the first mentioned end plate openings; and then the first mentioned end plate is brought into substantial abutment with the catacomb.

It will be recognized by those persons skilled in the art that the above described method will lend itself to considerable savings in labor and in assembly time as compared to methods previously practiced. Production is not only increased but the design and method of assembly is flexible in that no machinery changes are required to change from one size of component to another. Components of widely varying lengths and diameters may be handled with equal ease because catacombs can be made any size and at relatively low cost. Furthermore, miniaturization and automatic production are conducive to complex wiring since two plates rather than one are used.

Thus, complex electronic equipment can be designed to be divided into small units each being similar to the one herein described. These units would be disposable when found to be faulty in the field and would help decrease costly trouble shooting.

Although the method steps of the present invention have been described with respect to one embodiment of finished product and with the assistance of particular forms of apparatus, it will, no doubt, be apparent also to those persons skilled in the art that the method steps outlined are applicable to other end items as well as other structural aids may be employed in practicing those steps. For example, the apertures in the end plates may be tapered on the side of the plate adjacent to the catacomb thereby to facilitate threading the leads. In addition, it will be recognized by such persons that changes and modifications in the method steps themselves, as well as changes in the order in which the steps outlined are to be performed, are possible within the spirit of the present invention. Therefore, it is desired that the particular form of the present invention shown and described herein shall be considered as illustrative and not as limiting.

I claim:

1. The method of assembling into a unit a plurality of electrical components which have leads extending from their opposite ends, which method comprises the steps of providing a catacomb having a plurality of openings of greater diameter than that of said components and disposed parallel to each other and extending therethrough, providing first and second end plates for said catacomb having openings therethrough of a size smaller than said components and larger than said leads and correspondingly located with respect to said catacomb openings, supporting said catacomb substantially in contact with and above said first plate, inserting the electrical components into said catacomb openings with the respective leads of those components to be associated with said first end plate extending through the openings in that plate, supporting said second end plate with the openings thereof in a position to receive the leads of those components to be associated therewith, moving said catacomb away from said first end plate substantially into contact with said second end plate, inverting the assembly of said end plates, said catacomb and said components, vibrating the component leads associated with said second end plate to facilitate their insertion through the openings in that plate, moving said first end plate substantially into contact with said catacomb and fastening said component leads to the respective end plate associated therewith, thereby to form the unit with the components disposed within said catacomb and with the component leads extending through the openings in said end plates.

2. The method of assembling into a unit a plurality of electrical components which have leads extending from their opposite ends, which method comprises the steps of providing a catacomb having a plurality of openings of greater diameter than that of said components and disposed parallel to each other and extending therethrough, providing first and second end plates for said catacomb having openings therethrough of a size smaller than said components and larger than said leads and correspondingly located with respect to said catacomb openings, supporting said catacomb substantially in contact with and above said first end plate with the respective openings thereof in alignment, inserting said components into said catacomb openings, vibrating the component leads to be associated with said first end plate to facilitate their insertion through the openings in that plate, supporting said second end plate with the openings thereof in a position to receive the component leads to be associated therewith, moving said catacomb away from said first end plate substantially into abutment with said second end plate while maintaining the component leads disposed within said first end plate openings, inverting the assembly of said end plates, said catacomb and said components, vibrating the component leads associated with said second end plate to facilitate their insertion through the openings in that plate, moving said first end plate substantially into abutment with said catacomb and fastening said component leads to the respective end plate associated therewith, thereby to form the unit with the components disposed within said catacomb and with the component leads extending through the openings in said end plates.

3. The method of assembling into a unit a plurality of electrical components which have leads extending from their opposite ends, which method comprises the steps of providing a catacomb having a plurality of openings of greater diameter than that of said components and disposed parallel to each other and extending therethrough, providing first and second end plates for said catacomb having openings therethrough of a size smaller than said components and larger than said leads and correspondingly located with respect to said catacomb openings, supporting said catacomb substantially in contact with and above said first end plate with the respective openings thereof in alignment, inserting said components into said catacomb openings, simultaneously vibrating said catacomb and said first end plate to influence the component leads to be associated with said first end plate through the openings in that plate, supporting said second end plate with the openings thereof in a position to receive the component leads to be associated therewith, moving said catacomb away from said first end plate substantially into abutment with said second end plate while maintaining the component leads within said first end plate openings, inverting the assembly of said end plates, said catacomb and said components, vibrating said assembly to influence the component leads associated with said second end plate through the openings in that plate, moving said first end plate substantially into abutment with said catacomb and fastening said component leads to the respective end plate associated therewith, thereby to form the unit with the components disposed within said catacomb and with the component leads extending through the openings in said end plates.

4. The method of assembling into a unit a plurality of electrical components which have leads extending from their opposite ends, which method comprises the steps of providing a catacomb having a plurality of openings of greater diameter than that of said components and disposed parallel to each other and extending therethrough, providing first and second end plates for said catacomb having openings therethrough of a size smaller than said components and larger than said leads and correspondingly located with respect to said catacomb openings, supporting one end of said catacomb substantially in abutment with and above said first end plate with the respective openings thereof in alignment, providing a pilot catacomb having openings therethrough correspondingly located with respect to said first mentioned catacomb openings, supporting said pilot catacomb above the opposite end of said first mentioned catacomb with respective openings thereof in alignment, inserting said components into said pilot catacomb openings, simultaneously vibrating said first end plate, said first mentioned catacomb, said pilot catacomb and said components to influence the component leads to be associated with said first end plate through said end plate openings and to dispose said components within the confines of said first mentioned catacomb, removing said pilot catacomb, supporting said second end plate with the openings thereof in a position to receive the component leads to be associated therewith, moving said first mentioned catacomb away from said first end plate substantially into abutment with said second end plate while maintaining the component leads disposed within said first end plate openings, inverting the assembly of said end plates, said first mentioned catacomb and said components, vibrating said assembly to influence the component leads associated with said second end plate through the openings in that plate, moving said first end plate substantially into abutment with said first mentioned catacomb and fastening said component leads to the respective end plate associated therewith, thereby to form the unit with the components disposed within said catacomb and with the component leads extending through the openings in said end plates.

5. The method of assembling into a unit a plurality of electrical components which have leads extending from their opposite ends, which method comprises the steps of providing a catacomb having a plurality of openings of greater diameter than that of said components and disposed parallel to each other and extending therethrough, providing first and second end plates for said catacomb having openings therethrough of a size smaller than said components and larger than said leads and correspondingly located with respect to said catacomb openings, providing a jig, supporting said first end plate on said jig, supporting said catacomb on said jig above and substantially in contact with said first end plate with the respective openings thereof in alignment, inserting said components into said catacomb openings with the component leads to be associated with said first end plate through the openings in that plate, supporting said second end plate on said jig with the openings thereof in a position to receive the component leads to be associated therewith, moving said catacomb away from said first end plate substantially into abutment with said second end plate while maintaining the component leads disposed within said first end plate openings, inverting said jig together with the members supported thereon, vibrating said first end plate substantially into abutment with said catacomb and said component leads into the openings in said second end plate, removing said jig from said assembly and fastening said component leads to the respective end plate associated therewith, thereby to form the unit with the components disposed within said catacomb and with the component leads extending through the openings in said end plates.

6. The method of assembling into a unit a plurality of electrical components which have leads extending from their opposite ends, which method comprises the steps of providing a catacomb having a plurality of openings of greater diameter than that of said components and disposed parallel to each other and extending therethrough, providing first and second end plates for said catacomb having openings therethrough of a size smaller than said components and larger than said leads and correspondingly located with respect to said catacomb openings, providing a jig, supporting said first end plate on said jig, supporting said catacomb on said jig above and substantially in contact with said first end plate with the respective openings in alignment, providing a pilot catacomb having openings therethrough correspondingly located with respect to said first mentioned catacomb openings, supporting said pilot catacomb on said jig above said first mentioned catacomb with the respective openings thereof in alignment, inserting said components into said pilot catacomb openings, vibrating said jig together with the members supported thereon to influence the component leads to be associated with said first end plate through the openings in that plate and to dispose said components within the confines of said first mentioned catacomb, removing said pilot catacomb, supporting said second end plate with the openings thereof in a position to receive the component leads to be associated therewith, moving said first mentioned catacomb substantially into abutment with said second end plate while maintaining the component leads associated with said first end plate disposed within the openings thereof, inverting said jig together with the members supported thereon, vibrating said jig together with the members supported thereon to influence the component leads associated with said second end plate through the openings in that plate, moving said first end plate substantially into abutment with said first mentioned catacomb, removing said jig from said assembly and fastening said component leads to the respective end plate associated therewith, thereby to form the unit with the components disposed within the openings in said catacomb and with the component leads extending through the openings in said end plates.

7. The method of assembling into a printed circuit unit a plurality of electrical components which have leads extending from their opposite ends, which method comprises the steps of providing a catacomb having a plurality of openings of greater diameter than that of said components and disposed parallel to each other and extending therethrough, providing first and second end plates for said catacomb having openings therethrough of a size smaller than said compartments and larger than said leads and correspondingly located with respect to said catacomb openings, providing printed circuit connections on at least one side of each said end plate between selected openings and to which said component leads are to be fastened, supporting said first end plate with a side having printed circuit connections thereon facing downwardly, supporting said catacomb substantially in contact with and above said first end plate with the respective openings in alignment, inserting the electrical components into said catacomb openings with the respective leads of those components to be associated with said first end plate extending through said first end plate openings, supporting said second end plate with a side thereof having printed circuit connections facing upwardly and with the openings thereof in a position to receive the leads of those components to be associated with said second end plate, moving said catacomb away from said first end plate substantially into contact with said second end plate, inverting the assembly of said end plates, said catacomb and said components, vibrating the component leads associated with said second end plate to facilitate their insertion through the openings in that plate, moving said first end plate substantially into contact with said catacomb, and fastening the leads associated with said end plates to the printed circuit connections thereby to provide a printed circuit unit with the components disposed within said catacomb and with the component leads connected circuitwise.

8. The method of assembling into a printed circuit unit a plurality of electrical components which have leads extending from their opposite ends, which method comprises the steps of providing a catacomb having a plurality of openings of greater diameter than that of said components and disposed parallel to each other and extending therethrough, providing first and second end plates for said catacomb having openings therethrough of a size smaller than said components and larger than said leads and correspondingly located with respect to said catacomb openings, providing printed circuit connections on at least one side of each of said end plates between selected openings thereof and to which said component leads are to be fastened, supporting said first end plate with a side having printed circuit connections thereon facing downwardly, supporting said catacomb substantially in contact with and above said first end plate with the respective openings in alignment, providing a pilot catacomb having openings therethrough correspondingly located with respect to said first mentioned catacomb openings, supporting said pilot catacomb substantially above said first mentioned catacomb with the respective openings thereof in alignment, inserting said components into said pilot catacomb openings, simultaneously vibrating said first end plate, said first mentioned catacomb, said pilot catacomb and said components to influence the component leads to be associated with said first end plate through the openings in that plate and to dispose said components within the confines of said first mentioned catacomb, removing said pilot catacomb, supporting said second end plate with a side thereof having printed circuit connections facing upwardly and with the openings thereof in a position to receive the component leads to be associated therewith, moving said first mentioned catacomb away from said first end plate substantially into abutment with said second end plate while maintaining the component leads disposed within said first end plate openings, inverting the assembly of said end plates, said catacomb and said components, vibrating said assembly to influence the component leads associated with said second end plate through the openings in that plate, moving said first end plate substantially into abutment with said first mentioned catacomb, and fastening the leads associated with said end plates to the printed circuit connections thereby to provide a printed circuit unit with the components disposed within said first mentioned catacomb and with the component leads connected circuitwise.

9. The method of assembling into a printed circuit unit a plurality of electrical components which have leads extending from their opposite ends, which method comprises the steps of providing a catacomb having a plurality of openings of greater diameter than that of said components and disposed parallel to each other and extending therethrough, providing first and second end plates for said catacomb having openings therethrough of a size smaller than said components and larger than said leads and correspondingly located with respect to said catacomb openings, providing printed circuit connections on at least one side of each said end plate between selected openings and to which said component leads are to be fastened, providing a jig, supporting said first end plate on said jig with a side having printed circuit connections thereon facing downwardly, supporting said catacomb on said jig above and substantially in contact with said first end plate with the respective openings in alignment, providing a pilot catacomb having openings therethrough correspondingly located with respect to said first mentioned catacomb openings, supporting said pilot catacomb on said jig above said first mentioned catacomb with the respective openings thereof in alignment, inserting said components into said pilot catacomb openings, vibrating said jig together with the members supported thereon to influence the component leads to be associated with said first end plate through the openings in that plate and to dispose said components within the confines of said first mentioned catacomb, removing said pilot catacomb, supporting said second end plate on said jig above said first mentioned catacomb with a side thereof having printed circuit connections facing upwardly and with the openings thereof in a position to receive the component leads to be associated therewith, moving said first mentioned catacomb away from said first end plate substantially into abutment with said second end plate while maintaining the component leads disposed within said first end plate openings, inverting said jig together with the members supported thereon, vibrating said jig together with the members supported thereon to influence the component leads associated with said second end plate through the openings in that plate, moving said first end plate substantially into abutment with said first mentioned catacomb, removing said jig from the members supported thereon, and fastening the leads associated with said end plates to the printed circuit connections, thereby to provide a printed circuit unit with the components disposed within said first mentioned catacomb and with the components leads connected circuitwise.

10. The method of assembling into a unit a plurality of electrical components which have leads extending from their opposite ends, which method comprises the steps of providing a catacomb having a plurality of openings of greater diameter than that of said components and disposed parallel to each other and extending therethrough, providing first and second end plates for said catacomb having openings therethrough of a size smaller than said components and larger than said leads and correspondingly located with respect to said catacomb openings for receiving the component leads, fore-shortening the component leads to be associated with said second end plate respectively to predetermined lengths, supporting said catacomb substantially in contact with and above said first plate with the respective openings thereof in alignment, inserting the electrical components into said catacomb openings with the respective leads of those components to be associated with said first end plate extending through the openings in that plate and with the fore-shortened leads extending upwardly beyond said catacomb, supporting said second end plate above said fore-shortened leads with the openings thereof in a position to receive those leads, moving said catacomb away from said first end plate substantially into contact with said second end plate, inverting the assembly of said end plates, said catacomb and said components, vibrating the fore-shortened leads to facilitate their insertion through the openings in said second end plate, moving said first end plate substantially into contact with said catacomb and fastening said component leads to the respective end plate associated therewith, thereby to form the unit with the components disposed within said catacomb and with the component leads extending through the openings in said end plates.

11. The method of assembling into a unit a plurality of electrical components which have leads extending from their opposite ends, which method comprises the steps of providing a catacomb having a plurality of openings of greater diameter than that of said components and disposed parallel to each other and extending therethrough, providing first and second end plates having openings therethrough of a size smaller than said components and smaller than said leads and correspondingly located with respect to said catacomb openings for receiving the component leads, fore-shortening the component leads to be associated with said second end plate respectively to predetermined lengths, supporting said catacomb substantially in contact with and above said first end plate with the respective openings thereof in alignment, inserting the components into said catacomb openings with the leads thereof to be associated with said first end plate extending downwardly and with the fore-shortened leads thereof extending upwardly, simultaneously vibrating said catacomb and said first end plate to influence the component leads to be associated with said first end plate through the openings in that plate and with the fore-shortened leads extending upwardly beyond said catacomb, supporting said second end plate above said fore-shortened leads with the openings thereof in a position to receive those leads, moving said catacomb away from said first end plate substantially into abutment with said second end plate while maintaining the component leads associated with said first end plate within the openings in that plate, inverting the assembly of said end plates, said catacomb and said components, vibrating said assembly to influence the fore-shortened leads through the openings in said second end plate, moving said first end plate substantially into abutment with said catacomb and fastening said component leads to the respective end plate associated therewith, thereby to form the unit with the components disposed within said catacomb and with the component leads extending through the openings in said end plates.

12. The method of assembling into a unit a plurality of electrical components which have leads extending from their opposite ends, which method comprises the steps of providing a catacomb having a plurality of openings of greater diameter than that of said components and disposed parallel to each other and extending therethrough, providing first and second end plates for said catacomb having openings therethrough of a size smaller than said components and larger than said leads and correspondingly located with respect to said catacomb openings for receiving the component leads, providing a jig, supporting said first end plate on said jig, supporting said catacomb on said jig above and substantially in contact with said first end plate with the respective openings thereof in alignment, fore-shortening those leads of the components to be associated with said second end plate respectively to predetermined lengths, inserting said components into said catacomb openings with the component leads to be associated with said first end plate extending through the openings in that plate and with the fore-shortened leads extending above said catacomb, supporting said second end plate on said jig above said fore-shortened leads with the openings thereof aligned respectively with the openings in said catacomb in a position to receive the fore-shortened leads, moving said catacomb away from said first end plate substantially into abutment with said second end plate while maintaining the component leads associated with said first end plate within the openings in that plate, inverting said jig together with the members supported thereon, vibrating said first end plate substantially into abutment with said catacomb and the fore-shortened leads through the openings in said second end plate, removing said jig from said assembly and fastening said component leads to the respective end plate associated therewith, thereby to form the unit with the components disposed within said catacomb and with the component leads extending through the openings in said end plates.

13. The method of assembling into a printed circuit unit a plurality of electrical components which have leads extending from their opposite ends, which method comprises the steps of providing a catacomb having a plurality of openings of greater diameter than that of said components and disposed parallel to each other and extending therethrough, providing first and second end plates for said catacomb having openings therethrough of a size smaller than said components and larger than said leads and correspondingly located with respect to said catacomb openings for receiving the component leads, providing printed circuit connections on at least one side of each said end plate between selected openings and to which said component leads are to be fastened, supporting said first end plate with a side having printed circuit connections thereon facing downwardly, supporting said catacomb substantially in contact with and above said first end plate with the respective openings thereof in alignment, fore-shortening those leads of the components to be associated with said second end plate respectively to predetermined lengths, inserting said components into said catacomb openings with the component leads to be associated with said first end plate extending through the openings in that plate and with the fore-shortened leads extending above said catacomb, supporting said second end plate above said fore-shortened leads with a side thereof having printed circuit connections thereon facing upwardly and with the openings thereof aligned with the openings in said catacomb in a position to receive said fore-shortened leads, moving said catacomb away from said first end plate substantially into contact with said second end plate while maintaining the component leads associated with said first end plate within the openings in that plate, inverting the assembly of said end plates, said catacomb and said components, vibrating said fore-shortened leads to facilitate their insertion through the openings in said second end plate, moving said first end plate substantially into contact with said catacomb, and fastening the leads associated with said end plates to the printed circuit connections thereon, thereby to provide a printed circuit unit with the components disposed within said catacomb and with the component leads connected circuitwise.

14. The method of assembling into a printed circuit unit a plurality of electrical components which have leads extending from their opposite ends, which method comprises the steps of providing a catacomb having a plurality of openings of greater diameter than that of said components and disposed parallel to each other and extending therethrough of a size smaller than said components and larger than said leads and providing first and second end plates for said catacomb having openings therethrough correspondingly located with respect to said catacomb openings for receiving the component leads, providing printed circuit connections on at least one side of each said end plate between selected openings and to which said component leads are to be fastened, providing a jig, supporting said first end plate on said jig with a side having printed circuit connections thereon facing downwardly, supporting said catacomb on said jig above and substantially in contact with said first end plate with the respective openings thereof in alignment, providing a pilot catacomb having openings therethrough correspondingly located with respect to said first mentioned catacomb openings, supporting said pilot catacomb on said jig above said first mentioned catacomb with the respective openings thereof in alignment, fore-shortening those leads of the components to be associated with said second end plate respectively to predetermined lengths, inserting said components into said pilot catacomb openings with said fore-shortened leads extending upwardly, vibrating said jig together with the members supported thereon to influence the component leads to be associated with said first end plate through the openings in that plate and to dispose said components within the confines of said first mentioned catacomb said fore-shortened leads extending above said first mentioned catacomb, removing said pilot catacomb, supporting said second end plate on said jig above said fore-shortened leads with a side thereof having printed circuit connections thereon facing upwardly and with the openings thereof aligned with the openings in said first mentioned catacomb in a position to receive said fore-shortened leads, moving said first mentioned catacomb away from said first end plate substantially into abutment with said second end plate while maintaining the component leads disposed within said first end plate openings, inverting said jig together with the members supported thereon, vibrating said jig together with the members supported thereon to influence said fore-shortened leads through the openings in said second end plate, moving said first end plate substantially into abutment with said first mentioned catacomb, removing said jig from the members supported thereon, and fastening the leads associated with said end plates to the printed circuit connections thereon, thereby to provide a printed circuit unit with the components disposed within said first mentioned catacomb and with the component leads connected circuitwise.

15. The method of assembling into a unit a plurality of electrical components which have leads extending from their opposite ends, which method comprises the steps of providing a catacomb having a plurality of openings of greater diameter than that of said components and disposed parallel to each other and extending therethrough, providing first and second end plates for said catacomb having openings therethrough of a size smaller than said components and larger than said leads and correspondingly located with respect to said catacomb openings for receiving the component leads, supporting said catacomb substantially in contact with and above said first plate with the respective openings thereof in alignment, inserting said electrical components into said catacomb openings with the respective leads of those components to be associated with said first end plate extending through the openings in that plate, fore-shortening the leads of those components to be associated with said second end plate to an extent such that the ends thereof are substantially the same distance from said first end plate, supporting said second end plate above said fore-shortened leads with the openings thereof aligned with the openings in said catacomb in a position to receive those leads, moving said catacomb away from said first end plate substantially into contact with said second end plate while maintaining the leads associated with said first end plate within the openings in that plate, inverting the assembly of said end plates, said catacomb and said components, vibrating the fore-shortened leads to facilitate their insertion through the openings in said second end plate, moving said first end plate substantially into contact with said catacomb and fastening said component leads to the respective end plate associated therewith, thereby to form the unit with the components disposed within said catacomb and with the component leads extending through the openings in said end plates.

16. The method of assembling into a printed circuit unit a plurality of electrical components which have leads extending from their opposite ends, which method comprises the steps of providing a catacomb having a plurality of openings of greater diameter than that of said components and disposed parallel to each other and extending therethrough, providing first and second end plates for said catacomb having openings therethrough of a size smaller than said components and larger than said leads and correspondingly located with respect to said catacomb openings for receiving the component leads, providing printed circuit connections on at least one side of each said end plate between selected openings and to which said component leads are to be fastened, supporting said first end plate with a side having printed circuit connections thereon facing downwardly, supporting said catacomb substantially in contact with and above said first end plate with the respective openings thereof in alignment, inserting said components into said catacomb openings with the component leads to be associated with said first end plate extending through the openings in that plate, fore-shortening the leads of those components to be associated with said second end plate to an extent such that the ends thereof are substantially the same distance from said first end plate, supporting said second end plate above said fore-shortened leads with a side thereof having printed circuit connections thereon facing upwardly and with the openings thereof aligned with the openings in said catacomb in a position to receive said fore-shortened leads, moving said catacomb away from said first end plate substantially into contact with said second end plate while maintaining the component leads associated with said first end plate within the openings in that plate, inverting the assembly of said end plates, said catacomb and said components, vibrating said fore-shortened leads to facilitate their insertion through the openings in said second end plate, moving said first end plate substantially into contact with said catacomb, and fastening the leads associated with said end plates to the printed circuit connections thereon, thereby to provide a printed circuit unit with the components disposed within said catacomb and with the component leads connected circuitwise.

No references cited.